(12) United States Patent
Bancel et al.

(10) Patent No.: US 9,703,996 B2
(45) Date of Patent: *Jul. 11, 2017

(54) METHOD FOR MANAGING COMMUNICATION BETWEEN AN ELECTRONIC DEVICE, FOR EXAMPLE A CONTACTLESS CHIP CARD, AND A COMMUNICATION APPARATUS, FOR EXAMPLE A READER, AND CORRESPONDING ELECTRONIC DEVICE

(71) Applicant: STMICROELECTRONICS (ROUSSET) SAS, Rousset (FR)

(72) Inventors: Frederic Bancel, Senas (FR); Nathalie Link, Trets (FR); Brigitte Hennebois, Ginasservis (FR); David Chomaud, Saint Cyr sur Mer (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 12 days.

This patent is subject to a terminal disclaimer.

(21) Appl. No.: 15/345,583

(22) Filed: Nov. 8, 2016

(65) Prior Publication Data

US 2017/0053141 A1 Feb. 23, 2017

Related U.S. Application Data

(63) Continuation of application No. 13/805,953, filed as application No. PCT/EP2011/059706 on Jun. 10, 2011, now Pat. No. 9,560,169.

(30) Foreign Application Priority Data

Jun. 22, 2010 (FR) ..................................... 10 54939

(51) Int. Cl.
*G06F 11/00* (2006.01)
*H04B 7/00* (2006.01)
(Continued)

(52) U.S. Cl.
CPC ..... *G06K 7/10297* (2013.01); *G06K 7/10138* (2013.01); *G06K 19/0723* (2013.01); *H04L 69/08* (2013.01)

(58) Field of Classification Search
None
See application file for complete search history.

(56) References Cited

U.S. PATENT DOCUMENTS

| 6,883,715 B1* | 4/2005 | Fruhauf | G06K 19/07 235/441 |
| 2002/0027161 A1* | 3/2002 | Kakuta | G07C 9/00182 235/382 |

(Continued)

FOREIGN PATENT DOCUMENTS

| KR | WO 2006110000 A1 * | 10/2006 | ........... G06K 7/0008 |
| WO | 2006110000 | 10/2006 | |

*Primary Examiner* — Christopher Wyllie
(74) *Attorney, Agent, or Firm* — Slater Matsil, LLP

(57) ABSTRACT

The device is equipped with several protocol decoding means (DCDi) corresponding respectively to various communication protocols so as to be capable of dialoguing with the said communication apparatus during transactions selectively according to one of these communication protocols; the method comprises an automatic protocol detection comprising a) an activation (40) of all the decoding means at the start of a transaction, b) a delivery of the signal received by the electronic device to all the decoding means, c) an analysis (41) of at least one signal delivered by at least one of the decoding means and d) a selection (42) of one of the decoding means on the basis of the result of the said analysis, and a conducting of the said transaction with the selected decoding means.

28 Claims, 4 Drawing Sheets

(51) Int. Cl.
  *G08C 19/12* (2006.01)
  *G06K 7/10* (2006.01)
  *G06K 19/07* (2006.01)
  *H04L 29/06* (2006.01)

(56) References Cited

U.S. PATENT DOCUMENTS

| | | | | |
|---|---|---|---|---|
| 2003/0094491 A1* | 5/2003 | Nakabe | G06K 7/0008 | 235/451 |
| 2005/0060469 A1* | 3/2005 | Feng | G11O 5/066 | 710/305 |
| 2005/0219132 A1* | 10/2005 | Charrat | H01Q 1/22 | 343/745 |
| 2005/0224589 A1* | 10/2005 | Park | G06K 19/07732 | 235/492 |
| 2006/0290496 A1* | 12/2006 | Peeters | A61B 5/0002 | 340/572.1 |
| 2007/0157029 A1* | 7/2007 | Mani | G06F 12/1425 | 713/183 |
| 2008/0084310 A1* | 4/2008 | Nikitin | G06K 7/0008 | 340/572.7 |
| 2009/0166421 A1* | 7/2009 | Finn | G06K 7/0008 | 235/439 |
| 2009/0295543 A1* | 12/2009 | Kita | G06K 19/0723 | 340/10.1 |
| 2010/0038415 A1* | 2/2010 | Leutgeb | G06K 7/0008 | 235/375 |
| 2010/0073138 A1* | 3/2010 | Suzuki | G06K 7/10297 | 340/10.1 |
| 2010/0240318 A1* | 9/2010 | Tomoeda | G06K 7/10297 | 455/68 |
| 2011/0183635 A1* | 7/2011 | Kim | G06K 7/0008 | 455/85 |
| 2011/0243200 A1* | 10/2011 | Kargl | H03M 1/1255 | 375/219 |
| 2011/0307305 A1* | 12/2011 | Kohli | G07B 15/063 | 705/13 |

* cited by examiner

METHOD FOR MANAGING COMMUNICATION BETWEEN AN ELECTRONIC DEVICE, FOR EXAMPLE A CONTACTLESS CHIP CARD, AND A COMMUNICATION APPARATUS, FOR EXAMPLE A READER, AND CORRESPONDING ELECTRONIC DEVICE

CROSS REFERENCE TO RELATED APPLICATIONS

This application is a continuation application of pending U.S. Patent Publication No. 2013/0100825 published Apr. 25, 2013, which is a 371 Application of International Application No. PCT/EP2011/059706 filed Jun. 10, 2011, which claims priority to FR Application No. 1054939 filed Jun. 22, 2010, all of which are hereby incorporated herein in their entireties by reference.

FIELD OF THE DISCLOSURE

The present disclosure relates to communication between an electronic device and a communication apparatus, and more particularly to the management of the protocol for communication between this device and communication apparatus.

BACKGROUND

Numerous different communication protocols exist for communication between an integrated circuit (IC "chip") card and a reader. It is possible to cite, for example, the I2C and ISO-7816 protocols, more particularly, suited to "contact" communication between an IC card and a reader, i.e. when the former is in contact with the reader. It is also possible to cite the type A and type B protocols defined in ISO standard 14443, and more particularly intended for wireless or contactless communication between a IC card and a reader, i.e. when the IC card and the reader are remote from one another. Moreover, certain IC cards can be equipped both with contacts for contact communication with a reader, and also with an antenna, for communication of the "contactless" type.

Allowing for multiple communication protocols, certain IC cards contain, during their manufacture, various modules, respectively assigned to various communication protocols, and offer the IC card the possibility of communicating with a reader according to one of its implemented protocols. On the other hand, during the customization of the card, i.e. when it is delivered to an operator (a banking organization, for example), the choice of the communication protocol is fixed as a function of the purpose provided of the client. Consequently, the IC card may then be able to communication only with this chosen protocol and may therefore be incapable of communicating according to another protocol.

SUMMARY

According to an aspect, a method for managing communication between an electronic device and a communication apparatus, allowing, within the electronic device, for example the IC card, automatic detection of a protocol from among a predefined set of communication protocols that the card can implement.

According to an embodiment, a protocol detection may be automatic, fast and simple to implement. According to the embodiment, there is proposed a method for managing communication between an electronic device and a communication apparatus. The device may be equipped with several protocol decoding means or protocol decoders, corresponding respectively to various communication protocols, so as to be capable of communicating with the communication apparatus during transactions, selectively according to one of these communication protocols. The method may comprise an automatic protocol detection comprising: a) an activation of all of the decoders at the start of a transaction; b) a delivery of the signal received by the electronic device to all of the decoders; c) an analysis of at least one signal delivered by at least one of the decoders; and d) a selection of one of the decoders on the basis of the result of the analysis, and a conducting of the transaction with the selected decoder.

The duration of the communication between the device, for example, the IC card, and the apparatus, for example, the reader, may be longer or shorter depending on the application. Thus, when the communication is performed by successive frames, a transaction can comprise one or more receive and/or send frames, optionally separated by work periods of the processor of the device.

Thus, according to this aspect, all the decoders are activated so as to each receive the input signal, and the output signals from these decoders are analyzed sequentially or in parallel. By activating all the decoders and performing such an analysis on the output signals from these decoders, it is possible to rapidly detect the communication protocol while minimizing the risk of the system looping back indefinitely, which might have been the case if the decoders are activated one after the other.

Moreover, protocol detection may be performed automatically, for example, without any external control signal originating from the microprocessor of the IC card. Indeed, the decoders may be all activated at the start of the transaction for the automatic detection of the protocol and may all simultaneously receive the same signal received by the device.

Additionally, in the presence of this signal and regardless of the content of this signal, the automatic protocol detection may comprise within each decoder an automatic attempt to identify features of the protocol which is supposed to be decoded by the decoder, i.e. without it being necessary to trigger an internal protocol identification processing by a specific control signal coming from components external to the decoders, and without the need to deliver a specific signal to be decoded coming from, for example, components external to the decoders.

Further, step c) is automatically initiated in the presence of at least one signal delivered by at least one of the decoders. In other words, the mere presence of the at least one delivered signal may be sufficient to trigger (control) the analysis of the signal or signals delivered by the decoders for automatically detecting the protocol.

This automatic protocol detection is advantageously implemented, not by software, but by hardware. In this regard, this automatic protocol detection may comprise the use of at least one state machine implemented by logic means or a logic circuit. The fact that the analysis in step c) is performed outside of the decoder may facilitate its implementation in the form of a state machine.

According to an embodiment, as soon as a decoder delivers at least one cue or indication identifying the protocol associated with this decoders, or when all the decoders except one deliver an error cue, the decoders having delivered the at least one identification cue or the decoders not having delivered an error cue are selected. And, according to an embodiment, the automatic protocol detection may comprise repetition of steps c) and d), when all the decoders have delivered an error cue. Stated otherwise, the analysis of the signals delivered by the decoders is then reiterated.

According to an embodiment, allowing a saving of electrical power, there may be provided after step d) a deactivation of all the decoders that differ from the selected decoders. According to an embodiment, when there is no deactivation of the decoders that differ from the selected decoders after step d), there is provision, if during the conducting of the transaction, the selected decoders may deliver an error cue, to then repeat steps c) and d) of the automatic protocol detection. On the other hand, if all the decoders that differ from the selected decoders have been deactivated, there is provision, according to an embodiment, to repeat the entirety of the automatic protocol detection, comprising in particular step a), if, during the conducting of the transaction, the selected decoders delivers an error cue.

According to an embodiment, the automatic protocol detection is repeated at the end of the transaction, or else at least steps c) and d) if the decoders, that differ from the selected decoders, have not been deactivated, this being so during at least one subsequent transaction until a stopping criterion is satisfied. This stopping criterion can vary according to the applications. Thus, the stopping criterion may be, for example, the end of the communication between the card and the reader. In this case, the protocol can be detected during each transaction.

This stopping criterion may be, for example, a number of transactions, onwards of which it is considered that the communication protocol may no longer change. This number may or may not be predefined. The satisfying of the stopping criterion may be, as may be seen hereinafter, the end of a specific communication phase, for example, an anti-collision management phase, marked by the sending of a signal originating from the processor of the card.

According to an embodiment, the selection of the decoders may be performed when the decoders may deliver at least two cues identifying the protocol associated with this decoders. In certain cases, this may allow for better differentiation of one communication protocol from another. In certain applications, the communication between the device and the communication apparatus can comprise a first communication phase, for example, an anticollision management phase in the case of a remote communication, comprising several transactions in the course of which the same decoders have been selected, followed by a second communication phase and, in this case, these same decoders are advantageously retained in the second communication phase.

Thus, for example, in an application of remote communication between an IC card and a reader, if a decoder has been constantly selected in the course of the transactions of the anticollision management phase, it may be appropriate to retain this decoder while conducting the communication between the IC card and the reader. The device may be an IC card, and at least one of the communication protocols may be a communication protocol allowing contactless communication between the IC card and the communication apparatus.

At least one of the communication protocols may also be a communication protocol allowing contact communication between the IC card and the communication apparatus. As a variant, at least two communication protocols may be communication protocols allowing contactless communication between the IC card and the communication apparatus, for example, type A and type B protocols defined in ISO standard 14 443.

According to another aspect, an electronic device, may comprise an interface for communication with a communication apparatus, and processing means or a processor coupled to the communication interface. The communication interface may comprise input means or an input for receiving an input signal, several protocol decoders coupled to the input and corresponding respectively to several different protocols for communication with the communication apparatus during transactions, management means or a manager module configured to activate all the decoders at the start of a transaction, and automatic protocol detection means or an protocol detection module comprising analysis means or an analyzer configured to perform an analysis of the signal or signals delivered by at least one of the decoders and selection means or a selector for selecting one of the decoders on the basis of the result of the analysis.

According to an embodiment, the selector may be configured to select the decoders delivering at least one cue identifying the protocol associated with this decoder, or when all the decoders except one deliver an error cue, the decoder not having delivered an error cue. According to an embodiment, the protocol detection module may comprise control means or a controller configured to reactivate the analyzer and the selector when all the decoders have delivered an error cue.

According to an embodiment, the protocol detection module may comprise control means or a controller configured to reactivate the analyzer and the selector, if the selected decoders delivers an error cue. According to an embodiment, the controller may be configured to deactivate all the decoders that differ from the selected decoders.

According to an embodiment, the manager module may be configured to reactivate all the decoders as well as the protocol detection module if, during the conducting of the transaction, the selected decoders delivers an error cue. According to an embodiment, the controller may be configured to reactivate at least the analyzer and the selector, or else all the decoders as well as the protocol detection module, at the end of the transaction during at least one subsequent transaction until a stopping criterion is satisfied. According to an embodiment, the selector may be configured to select the decoders delivering at least two cues identifying the protocol associated with these decoders.

According to an embodiment, the communication between the device and the communication apparatus may comprise a first communication phase comprising several transactions in the course of which the same decoder has been selected, followed by a second communication phase, and the communication interface is furthermore configured to retain this same decoder in the second communication phase. According to an embodiment, the automatic protocol detection module may comprise a logic circuit implementing at least one state machine. According to an embodiment, the device may form a IC card, and at least one of the communication protocols may be a communication protocol allowing contactless communication between the IC card and the communication apparatus.

BRIEF DESCRIPTION OF THE DRAWINGS

Other advantages and characteristics of the present disclosure may be apparent on examining the detailed description of wholly non-limiting modes of implementation and embodiments, and the appended drawings in which.

DETAILED DESCRIPTION

Figure 1:
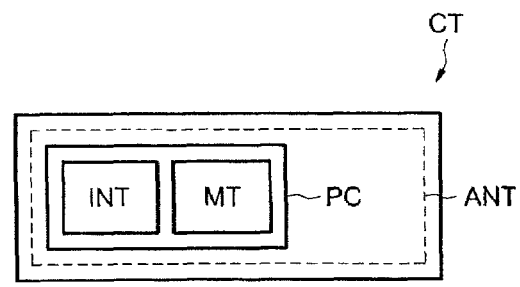
FIG. 1 is a schematic diagram of a device, according to the present disclosure.

In FIG. 1, the electronic device able to communicate with a communication apparatus is a IC card CT possessing an integrated circuit or microchip PC, incorporating, in a conventional manner, processing means or a processor MT comprising in particular a microprocessor, as well as a communication interface INT. The communication interface INT can comprise contact pads intended to cooperate with contact pads of the communication apparatus, for example, a reader, and/or input means or an input linked to an antenna ANT in the case where the card CT may be required to communicate with the reader within the framework of a contactless communication protocol.

Figure 2:
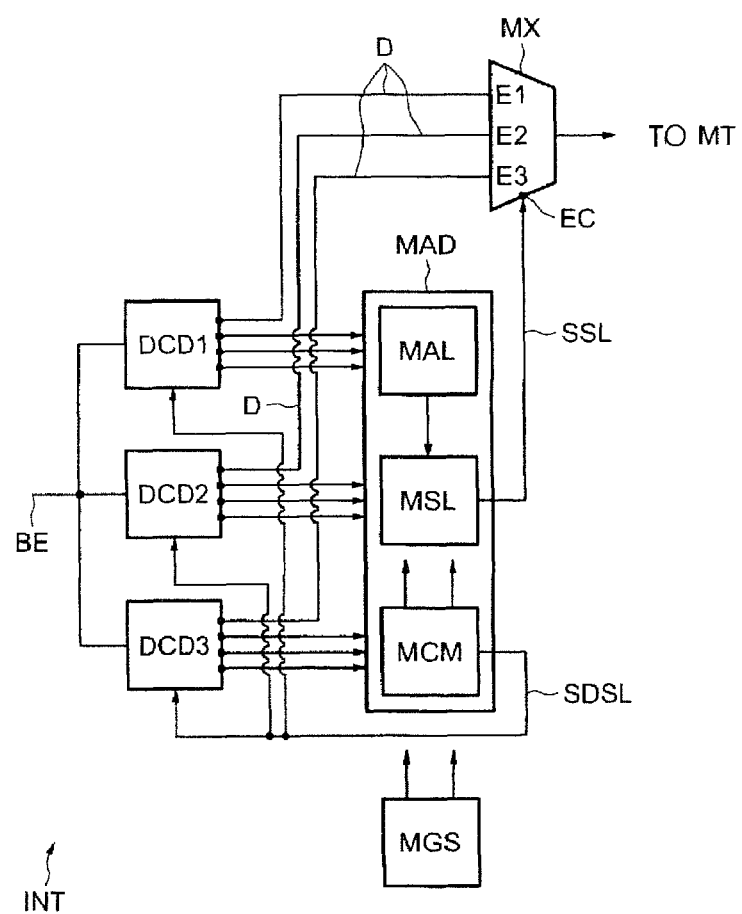
FIG. 2 is a schematic diagram in greater detail of an embodiment of a communication interface of a device according to the present disclosure.

In FIG. 2, it is assumed that the card CT is able to communicate with the reader according to a communication protocol chosen from three different communication protocols. In this regard, the communication interface comprises input means or an input BE for receiving the input signal, and several, here three, protocol decoders DCD1, DCD2, DCD3 coupled to the input BE and corresponding respectively to the three different communication protocols. These different decoders are intended to simultaneously receive the input signal.

It should be noted here that, although the reference BE designates the input, this may also be output means or an output intended to deliver a signal destined for the reader. In addition to these decoders DCDi, the communication interface INT also comprises a management means or a management module configured in particular to activate the decoders DCDi. In this regard, the manager module NGS can comprise, for example, means for generating a clock signal or a clock generator delivered on the initialization input of the decoders DCDi, and allowing their activation.

These decoders DCDi are intended to recognize the characteristics of a communication protocol and, at reception, to extract from the corresponding frames the useful data transmitted from the reader. The hardware structure of such decoders is conventional.

Although, as may be seen in greater detail hereinafter, the decoders are activated, during a protocol detection phase, at the start of each transaction of this phase, they may advantageously be activated permanently, as soon as the card is energized, and remain so as long as they are not deactivated. In this regard, as may be seen in greater detail hereinafter, all the decoders are never deactivated together and there is always at least one activated decoder.

In addition to the module which have just been mentioned, the communication interface INT also comprises means MAD of automatic protocol detection or an automatic protocol detection module. This automatic protocol detection module MAD is connected to the outputs of the decoders and may comprise analysis means or an analyzer MAL configured to perform an analysis of the signal or signals delivered by at least one of the decoders DCDi, and selection means or a selector MSL for selecting one of the decoders on the basis of the result of the analysis.

Functionally, this automatic protocol detection module MAD also comprises control means or a controller MCM configured in particular as may be seen in greater detail hereinafter, to, for example, reactivate the analyzer MAL and the selector MSL, or else to deactivate some of the decoders DCDi. In addition, there is also provided a multiplexer MX possessing a control input EC intended to receive a selection signal SSL originating from the selector MSL, and three inputs E1, E2, E3 respectively coupled to the three outputs of the decoders DCDi delivering the data D transmitted by the reader.

The other signals delivered by the decoders DCDi are, as may be seen in greater detail hereinafter, in particular one or more identification cues and/or error cues. These signals are delivered to the automatic protocol detection means MAD. The output of the multiplexer MX is coupled to the processor MT of the integrated circuit PC of the card CT.

With all the decoders being activated at the start of a transaction for the purpose of the automatic protocol detection, they may all receive simultaneously the same signal received by the device and are especially configured to, in the presence of the signal and regardless the content of this signal, automatically attempt to identify the features of the protocol they are supposed to decode, i.e. without it being necessary to trigger their internal protocol identification processing by a specific control signal coming from means or components external to the decoders, and without the need to deliver to them a specific signal to be decoded coming, for example, from means or components external to the decoders. Further, the automatic protocol detection module MAD may be configured to, at the start of the transaction and in the absence of any detected and identified protocol, automatically trigger a protocol detection in the presence of at least one signal delivered by at least one of the decoders.

In other words, the presence of the at least one delivered signal may be sufficient for triggering the automatic protocol detection. Thus, the at least one signal controls the triggering of the automatic protocol detection performed by the automatic protocol detection module MAD.

Further, the automatic protocol detection module MAD may be distinct from the decoders and associated in a common way to all decoders. Thus, it becomes possible, as it will be discussed in more detail hereafter to implement them in the form of a unique state machine. The implementation of this automatic protocol detection module MAD in the form of logic means or logic circuits implementing this state machine, is thus simplified and may contribute to the detection speed of the protocol.

Figure 3:
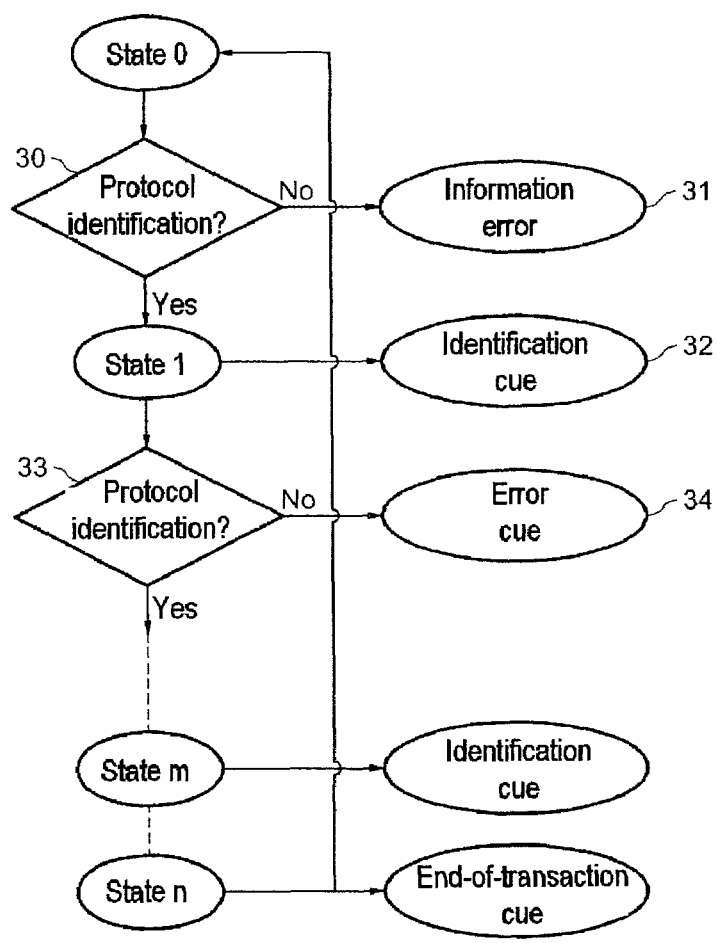
FIGS. 3 to 5 are schematic diagrams of flowcharts relating to modes of implementation of the method, according to the present disclosure.

In FIG. 3, a flowchart of a state machine implemented within a decoder DCDi is shown. From the "0" state, the decoder DCDi determines (step 30) whether it can identify, on the basis of the signal received at input, the characteristics of the protocol that it is supposed to decode. If such is not the case, the decoder then delivers an error cue (step 31). In the converse case, the decoder passes to the "1" state in which the decoder delivers an identification cue (step 32). This identification cue is, stated otherwise, a marker characteristic of the communication protocol.

During the conducting of the transaction, the decoder continues to seek to identify the protocol (step 33) so as optionally to deliver an error cue (step 34) if an error in the protocol is detected. In the converse case, a new identification cue or else the same as previously, is sent. The process is thus repeated from state to state, terminating at the level of the "n" state with the delivery of an end-of-transaction cue followed by a return to the "0" state.

A few examples of identification cues in the case of particular communication protocols may now be given. Thus, in an application of contactless communication between a IC card and a reader, it is possible to use, for example, the type A protocol defined by ISO standard 14443, or else the type B protocol also defined by this standard. In both these cases, a transaction starts with a signal reception period, followed by a period of processing, by the processor MT, of the command received, and terminates on completion of a period of transmission of a signal from the card to the reader.

For the type B protocol, when the signal input is at "0" for about 10.5 clock cycles, and then remains at "1" for about 2.5 cycles of the clock signal, a first logic signal is then sent or decoded. This logic signal is designated by the term "SOF" ("Start Of Frame") and forms a cue for identifying the type B protocol.

For a frame of type A, an identification cue is a logic signal designated by the term "SOC" ("Start Of Com"). It is delivered when a rising edge of the signal input is followed by ¾ or by 5/4 of a clock cycle before the next pause characterized potentially by an absence of clock signal and a signal input at the "0" level. There also exists, in the case of contactless communications, a protocol of type B', also defined by ISO standard 14443. In the type B' protocol, the identification cue is obtained when the serial input is at "0" for 10 clock cycles and then at "1" for 5 clock cycles.

There also exist protocols suited to contact communications. These are in particular the IC2 and ISO 7816 protocols, as will be appreciated by the person skilled in the art. These two protocols have a clock input and a data input. These two inputs may be common for the two protocols. In this case, to define which protocol is the one used for reception, reliance may be placed on several identification cues.

More precisely, for the I2C protocol, a first identification cue is characterized by a falling edge of the data input if the clock is at the "1" logic level. That said, this first identification cue is not sufficiently characteristic to be used as protocol selection. Hence, a second identification cue is advantageously used, this being the reception and the verification of the address which represents the first byte received by the protocol. It is only upon delivery of this second identification cue that the I2C protocol may be considered to be detected.

As regards ISO protocol 7816, the first identification cue may be a logic signal designated by the name "Start Bit" delivered when the data input is at "0" for 372 clock cycles. A second possible identification cue is the reception of a byte with verification of the parity.

Figure 4:
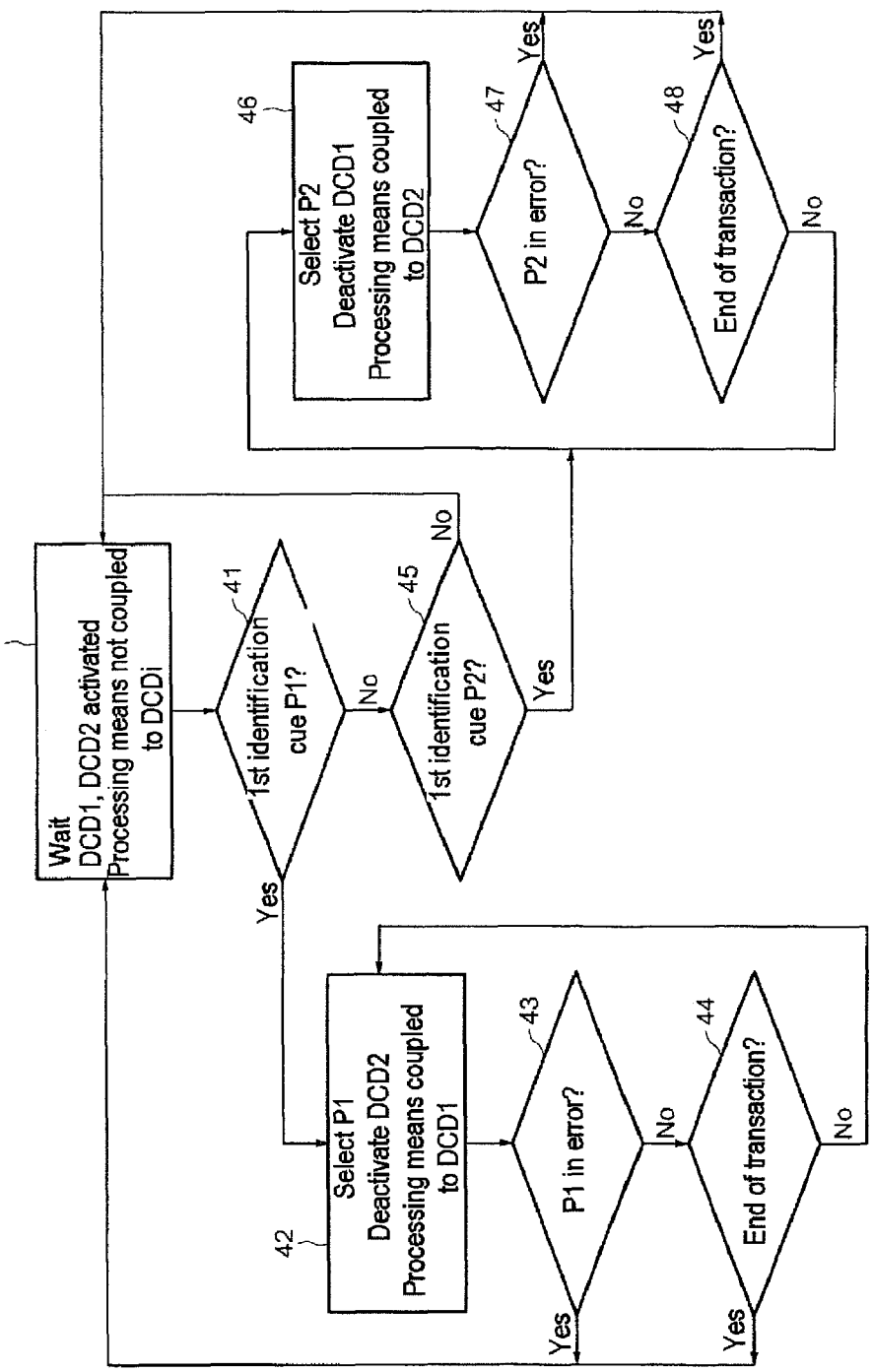

Reference is now made to FIG. 4 to describe an exemplary algorithm implemented within the automatic protocol detection module MAD. Here again, this involves a state machine. Just as for the state machine implemented in a decoder and illustrated in FIG. 3, the various instructions and returns are written in the VHDL language, and then the logic circuit allowing the hardware embodiment of the state machine of FIG. 4 are obtained by synthesis software.

It is assumed here for clarity of explanation, that the IC card is equipped only with two decoders, for example, a decoder DCD1 able to decode a type A contactless protocol P1 and a decoder DCD2 able to decode a type B contactless protocol P2. The state 40 corresponds to a standby state in which, for example, at the start of the transaction, the decoders DCD1 and DCD2 are activated.

The processor MT is not functionally coupled to the decoder DCDi. In the state 41, a check is carried out to verify whether the first identification cue, relating to the protocol P1, is received. In the negative, a check is carried out to verify whether the first identification cue relating to the protocol P2 is received (step 42). In the negative, the state machine returns to the standby state.

If the first identification cue relating to the protocol P1 is received, the protocol P1 is then selected and the multiplexer MX is controlled so as to link the data output of the decoder DCD1 to the processor MT. Moreover, so as to reduce power consumption, the decoder DCD2 is deactivated (signal SDSL, FIG. 2). In practice, no further clock signal is delivered to this decoder.

Next, the module MAD determines (step 43) whether or not they received an error cue relating to the protocol P1. In the affirmative, we return to step 40 and the two decoders are again activated. In the negative, we wait for the end of transaction (step 44) and, as long as the end-of-transaction signal has not been obtained, steps 42, 43 and 44 are repeated. On the other hand, at the end of the transaction, we return to step 40. Steps similar to steps 42, 43 and 44 are performed as regards the protocol P2 and are referenced 46, 47 and 48 respectively. Thus, in step 46, this time it is protocol P2 which is selected and decoder DCD1 which is deactivated.

Figure 5:
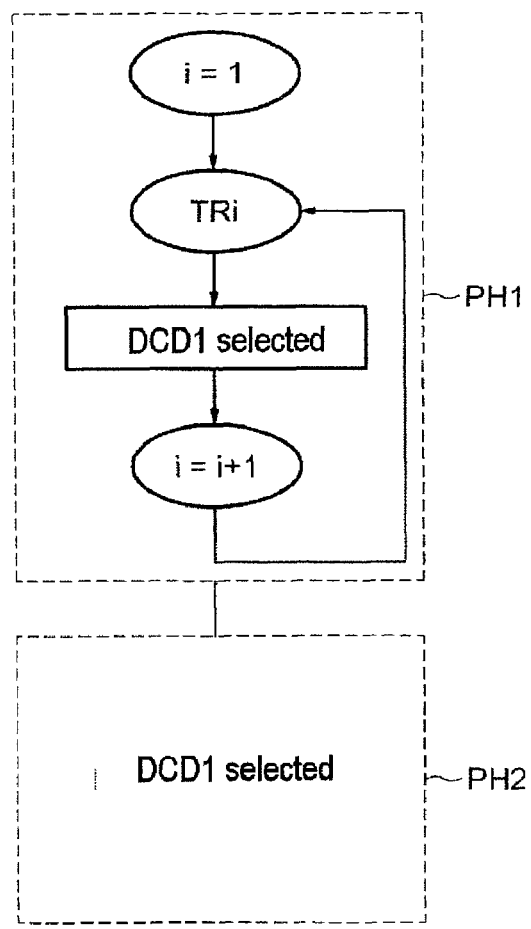

In a contactless communication application, there is generally a communication phase PH1 (FIG. 5) comprising anti-collision management between several cards that are able to communication with the reader. During this phase, if the decoder DCD1 has been selected in the course of the transactions between the card CT and the reader, then, in the phase PH2 following this phase PH1, the same decoder DCD1 is kept for the conducting of the communication between the card CT and the reader.

The invention claimed is:

1. A method for managing communication between an integrated circuit (IC) card and a communication apparatus, the IC card comprising a plurality of decoders for a plurality of communication protocols to communicate with the communication apparatus based upon at least one of the plurality of communication protocols, the method comprising:
routing an input signal received by the IC card to each of a plurality of decoders;
routing output signals of the plurality of decoders to a protocol detection module, the protocol detection module for analyzing each output signal generated from the plurality of decoders in parallel, each output signal comprising a respective decoded version of the input signal using a respective communication protocol;
selecting at least one of the plurality of decoders based upon a result of the analysis; and
conducting a transaction with the at least one selected decoder;
wherein the selecting comprises
if a decoder generates at least one indication identifying a communication protocol associated therewith, then the at least one indication comprises an identification cue based upon matching a marker characteristic of the input signal with a respective protocol of the decoder, and
if when each decoder delivers an error indication except one, then the error indication comprises an error cue because the matching of the marker characteristic of the input signal with the respective protocol of the decoder does not occur.

2. The method according to claim 1 wherein the analyzing and selecting are repeated when each decoder generates an error indication.

3. The method according to claim 1 further comprising repeating the analyzing and selecting if during the conducting of the transaction, the at least one selected decoder generates an error indication.

4. The method according to claim 1 further comprising repeating at least one of the analyzing and the selecting at an end of the transaction during at least one subsequent transaction until a stopping criterion is satisfied.

5. The method according to claim 1 further comprising repeating the activating, the analyzing, and the selecting at an end of the transaction during at least one subsequent transaction until a stopping criterion is satisfied.

6. The method according to claim 1 wherein the selecting is performed when the decoder generates a plurality of indications identifying the protocol associated therewith.

7. The method according to claim 1 wherein the communication between the IC card and the communication apparatus comprises a first communication phase comprising a plurality of transactions during which a same decoder has been selected, and a second communication phase where the same decoder is used.

8. The method according to claim 7 wherein the first communication phase comprises an anti-collision management phase.

9. The method according to claim 1 wherein at least one of the plurality of communication protocols comprises a communication protocol for wireless communication between the IC card and the communication apparatus.

10. The method according to claim 9 wherein other communication protocols comprise communication protocols for wireless communications between the IC card and the communication apparatus.

11. The method according to claim 10 wherein the other communication protocols comprise type A and type B protocols of an ISO standard 14443.

12. An integrated circuit (IC) for an IC card, the IC comprising:
a communication interface configured to communicate with a communication apparatus and comprising
a plurality of decoders, each decoder configured to decode an input signal using a corresponding communication protocol from a plurality thereof,
a protocol detector configured to perform an analysis of each output signal generated by said plurality of decoders using a respective communication protocol, and
a selector configured to
select a decoder from said plurality thereof based upon the analysis, and
if the decoder generates at least one indication identifying a communication protocol associated therewith, then the at least one indication comprises an identification cue based upon matching a marker characteristic of the input signal with a respective protocol of the decoder, and
if when each decoder delivers an error indication except one, then the error indication comprises an error cue because the matching of the marker characteristic of the input signal with the respective protocol of the decoder does not occur.

13. The IC according to claim 12 wherein said protocol detector comprises an analyzer, and a controller configured to reactivate said analyzer and said selector when each decoder has delivered an error indication.

14. The IC according to claim 13 wherein said controller is configured to reactivate said analyzer and said selector if the selected decoder generates an error indication.

15. The IC according to claim 13 wherein said controller is configured to reactivate said analyzer and said selector at an end of a transaction.

16. The IC according to claim 12 further comprising a manager module configured to reactivate said plurality of decoders and said protocol detector if, during the conducting of a transaction, the selected decoder generates an error indication.

17. The IC according to claim 16 wherein said manager module is configured to reactivate said plurality of decoders and said protocol detector at an end of a transaction.

18. The IC according to claim 12 wherein said selector is configured to select the decoder generating a plurality of indications identifying the communication protocol associated therewith.

19. The IC according to claim 12 wherein communication with the communication apparatus comprises:
a first communication phase comprising a plurality of transactions during which a same decoder is selected;
a second communication phase where said communication interface is configured to use the same decoder.

20. The IC according to claim 19 wherein the first communication phase comprises an anti-collision management phase.

21. The IC according to claim 12 wherein said protocol detector comprises a logic circuit configured to provide at least one state machine.

22. The IC according to claim 12 wherein said communication interface is configured for wireless communication with the communication apparatus based upon other communication protocols.

23. The IC according to claim 22 wherein the other communication protocols comprise communication protocols for wireless communication with the communication apparatus.

24. The IC according to claim 22 wherein the other communication protocols comprise type A and type B protocols defined in ISO standard 14443.

25. An integrated circuit (IC) comprising:
a plurality of decoders, each decoder configured to decode an input signal using a corresponding communication protocol from a plurality thereof;
a protocol detector configured to perform an analysis of each output signal generated by said plurality of decoders using a respective communication protocol; and
a selector configured to
select a decoder from said plurality thereof based upon the analysis, and
if the decoder generates at least one indication identifying a communication protocol associated therewith, then the at least one indication comprises an identification cue based upon matching a marker characteristic of the input signal with a respective protocol of the decoder, and
if when each decoder delivers an error indication except one, then the error indication comprises an error cue because the matching of the marker characteristic of the input signal with the respective protocol of the decoder does not occur.

26. The IC according to claim 25 wherein said protocol detector comprises an analyzer, and a controller configured to reactivate said analyzer and said selector when each decoder has delivered an error indication.

27. The IC according to claim 26 wherein said controller is configured to reactivate said analyzer and said selector if the selected decoder generates an error indication.

28. The IC according to claim 26 wherein said controller is configured to reactivate said analyzer and said selector at an end of a transaction.

\* \* \* \* \*